United States Patent
Laasik et al.

(10) Patent No.: US 8,413,199 B2
(45) Date of Patent: Apr. 2, 2013

(54) COMMUNICATION SYSTEM AND METHOD

(75) Inventors: Marek Laasik, Tallinn (EE); Madis Kaal, Tallinn (EE)

(73) Assignee: Skype, Dublin (IE)

( * ) Notice: Subject to any disclaimer, the term of this patent is extended or adjusted under 35 U.S.C. 154(b) by 264 days.

(21) Appl. No.: 12/455,210

(22) Filed: May 29, 2009

(65) Prior Publication Data

US 2010/0064328 A1    Mar. 11, 2010

(30) Foreign Application Priority Data

Sep. 5, 2008  (GB) .................................. 0816278.6

(51) Int. Cl.
*H04N 7/173* (2011.01)

(52) U.S. Cl. ......... 725/106; 725/98; 725/99; 348/14.01; 348/14.02; 348/14.03; 348/14.04; 348/14.05

(58) Field of Classification Search .............. 725/98–99, 725/106; 348/14.01–14.05
See application file for complete search history.

(56) References Cited

U.S. PATENT DOCUMENTS

| | | | |
|---|---|---|---|
| 5,506,572 A | 4/1996 | Hills et al. | |
| 5,587,928 A | 12/1996 | Jones et al. | |
| 5,812,770 A | 9/1998 | Sakai | |
| 5,856,821 A | 1/1999 | Funahashi | |
| 5,923,737 A | 7/1999 | Weishut et al. | |
| 6,061,434 A | 5/2000 | Corbett | |
| 6,151,619 A | 11/2000 | Riddle | |
| 6,209,025 B1 | 3/2001 | Bellamy | |
| 6,243,129 B1 | 6/2001 | Deierling | |

(Continued)

FOREIGN PATENT DOCUMENTS

| | | |
|---|---|---|
| DE | 19971016486 A1 | 9/1998 |
| DE | 102006001607 | 8/2006 |

(Continued)

OTHER PUBLICATIONS

International Search Report and Written Opinion for International Application No. PCT/EP2009/061410, date of mailing Oct. 20, 2009.

(Continued)

*Primary Examiner* — Pankaj Kumar
*Assistant Examiner* — Charles N Hicks
(74) *Attorney, Agent, or Firm* — Wolfe-SBMC

(57) ABSTRACT

A media device comprising: a memory storing a communication client application; a processor, coupled to the memory and operable to execute the communication client application, wherein the client application is programmed so as when executed to allow a user to establish a call with one or more other users via a packet-based communication network; and a remote control unit comprising wireless communication means arranged to transmit data to the processor, a control means coupled to the wireless communication means and configured to control the wireless communication means, user input means coupled to the control means and arranged to receive input commands from the user and provide the input commands to the control means, and a microphone coupled to the control means and arranged to receive audio signals from a user, wherein, responsive to the control means receiving a command to establish a call from the user input means, the control means is arranged to activate the wireless communication means from a deactivated state, establish a wireless connection with the processor, and transmit data comprising audio signals from the microphone using the wireless communication means to the processor for transmission in a call over the packet-based communication network.

23 Claims, 5 Drawing Sheets

U.S. PATENT DOCUMENTS

| | | |
|---|---|---|
| 6,286,140 B1 | 9/2001 | Ivanyi |
| 6,628,964 B1 | 9/2003 | Bates et al. |
| 6,636,269 B1 | 10/2003 | Baldwin |
| 6,789,105 B2 | 9/2004 | Ludwig et al. |
| 6,930,661 B2 | 8/2005 | Uchida et al. |
| 7,058,901 B1 | 6/2006 | Hafey et al. |
| 7,099,693 B2 | 8/2006 | Shin |
| 7,184,049 B2 | 2/2007 | Ballin et al. |
| 7,454,711 B2 | 11/2008 | Angiulo et al. |
| 7,573,988 B2 | 8/2009 | Lee et al. |
| 7,587,684 B2 | 9/2009 | Perttula |
| 7,954,124 B2 | 5/2011 | Rambo |
| 7,966,039 B2 | 6/2011 | Sadovsky et al. |
| 7,983,722 B2 | 7/2011 | Lowles et al. |
| 2001/0005197 A1 | 6/2001 | Mishra et al. |
| 2002/0109770 A1 | 8/2002 | Terada |
| 2002/0144259 A1 | 10/2002 | Gutta et al. |
| 2002/0199181 A1 | 12/2002 | Allen |
| 2003/0009768 A1 | 1/2003 | Moir |
| 2003/0036683 A1 | 2/2003 | Kehr et al. |
| 2003/0052648 A1 | 3/2003 | Hara et al. |
| 2003/0061033 A1 | 3/2003 | Dishert |
| 2003/0070177 A1 | 4/2003 | Kondo et al. |
| 2003/0070182 A1 | 4/2003 | Pierre et al. |
| 2003/0097661 A1 | 5/2003 | Li et al. |
| 2003/0105812 A1 | 6/2003 | Flowers et al. |
| 2003/0117419 A1 | 6/2003 | Hermanson |
| 2003/0142802 A1 | 7/2003 | Hong et al. |
| 2004/0003025 A1 | 1/2004 | Hao |
| 2004/0049624 A1 | 3/2004 | Salmonsen |
| 2004/0060067 A1 | 3/2004 | Yi |
| 2004/0128700 A1 | 7/2004 | Pan |
| 2004/0135819 A1 | 7/2004 | Maa |
| 2004/0163127 A1 | 8/2004 | Karaoguz et al. |
| 2004/0176132 A1 | 9/2004 | Thrasher |
| 2004/0207723 A1 | 10/2004 | Davis et al. |
| 2004/0214541 A1 | 10/2004 | Choi |
| 2004/0258059 A1 | 12/2004 | Frank et al. |
| 2005/0071686 A1 | 3/2005 | Bagga et al. |
| 2005/0146598 A1 | 7/2005 | AbiEzzi et al. |
| 2005/0165922 A1 | 7/2005 | Hatano |
| 2005/0190700 A1* | 9/2005 | Melpignano .................. 370/244 |
| 2005/0249196 A1 | 11/2005 | Ansari et al. |
| 2005/0286711 A1 | 12/2005 | Lee et al. |
| 2005/0289480 A1 | 12/2005 | Mathews et al. |
| 2006/0040638 A1* | 2/2006 | McQuaide .................... 455/403 |
| 2006/0080713 A1 | 4/2006 | Fujibayashi et al. |
| 2006/0095754 A1 | 5/2006 | Hyder et al. |
| 2006/0109268 A1 | 5/2006 | Napoli et al. |
| 2006/0181548 A1 | 8/2006 | Hafey et al. |
| 2006/0190443 A1 | 8/2006 | Mathews et al. |
| 2007/0039025 A1 | 2/2007 | Kraft et al. |
| 2007/0115346 A1 | 5/2007 | Kim et al. |
| 2007/0139514 A1 | 6/2007 | Marley |
| 2007/0147367 A1 | 6/2007 | Hwang et al. |
| 2007/0156686 A1 | 7/2007 | Kim et al. |
| 2007/0214482 A1 | 9/2007 | Nguyen |
| 2007/0216759 A1 | 9/2007 | Gonen et al. |
| 2007/0275766 A1 | 11/2007 | Kim et al. |
| 2007/0279482 A1 | 12/2007 | Oswald et al. |
| 2008/0031169 A1 | 2/2008 | Shi et al. |
| 2008/0034325 A1 | 2/2008 | Ording |
| 2008/0062249 A1 | 3/2008 | Nagase et al. |
| 2008/0150892 A1 | 6/2008 | Duhig et al. |
| 2008/0152110 A1 | 6/2008 | Underwood et al. |
| 2008/0186410 A1 | 8/2008 | Hardacker et al. |
| 2009/0036159 A1* | 2/2009 | Chen .......................... 455/556.1 |
| 2009/0167839 A1 | 7/2009 | Ottmar |
| 2009/0320073 A1 | 12/2009 | Reisman |
| 2010/0005497 A1 | 1/2010 | Maresca |
| 2010/0058408 A1* | 3/2010 | LaFreniere et al. ........... 725/106 |
| 2010/0060477 A1 | 3/2010 | Laasik et al. |
| 2010/0060715 A1 | 3/2010 | Laasik et al. |
| 2010/0060716 A1 | 3/2010 | Kert |
| 2010/0060788 A1 | 3/2010 | Blackburn et al. |
| 2010/0064329 A1 | 3/2010 | McLaughlin et al. |
| 2010/0064333 A1 | 3/2010 | Blackburn et al. |
| 2010/0064334 A1 | 3/2010 | Blackburn et al. |
| 2011/0043599 A1 | 2/2011 | Luo et al. |
| 2011/0173672 A1 | 7/2011 | Angiolillo et al. |

FOREIGN PATENT DOCUMENTS

| | | |
|---|---|---|
| EP | 0741484 A2 | 11/1996 |
| EP | 0919906 A2 | 11/1998 |
| EP | 1331762 | 7/2003 |
| EP | 1372333 A2 | 12/2003 |
| EP | 1622378 A1 | 2/2006 |
| EP | 1761048 A2 | 3/2007 |
| EP | 1853013 | 11/2007 |
| EP | 1860852 A1 | 11/2007 |
| EP | 1912175 A1 | 4/2008 |
| EP | 1940156 A2 | 7/2008 |
| EP | 2 110 796 A2 | 10/2009 |
| EP | 2353296 | 8/2011 |
| GB | 2410868 A | 8/2005 |
| GB | 2463110 | 3/2010 |
| GB | 2463124 | 3/2010 |
| JP | 2001-169368 | 6/2001 |
| JP | 2004080289 | 3/2004 |
| JP | 2004312320 | 11/2004 |
| JP | 2007067979 | 8/2005 |
| JP | 2008182463 | 8/2008 |
| WO | WO 98/51079 | 11/1998 |
| WO | WO 01/30070 A1 | 4/2001 |
| WO | WO 01/47210 A2 | 6/2001 |
| WO | WO 01/67315 A1 | 9/2001 |
| WO | WO 02/30105 A1 | 4/2002 |
| WO | WO 02/30116 A1 | 4/2002 |
| WO | WO 02/082343 A1 | 10/2002 |
| WO | WO-02082343 | 10/2002 |
| WO | WO 03/021960 A1 | 3/2003 |
| WO | WO 03/028373 A1 | 4/2003 |
| WO | WO 2005/009019 A2 | 1/2005 |
| WO | WO 2005/025194 A1 | 3/2005 |
| WO | WO 2007/098155 A2 | 8/2007 |
| WO | WO 2007/113580 A1 | 10/2007 |
| WO | WO 2007/127788 A2 | 11/2007 |
| WO | WO 2008/030711 A2 | 3/2008 |
| WO | WO 2009/094291 A1 | 7/2009 |
| WO | WO-2010026185 | 3/2010 |
| WO | WO-2010026187 | 3/2010 |
| WO | WO-2010026190 | 3/2010 |
| WO | WO-2010026191 | 3/2010 |

OTHER PUBLICATIONS

Search Report dated Dec. 2, 2009, issued in related Application No. GB0816278.6 (2 pages).

"Advisory Action", U.S. Appl. No. 12/455,084, (Mar. 21, 2012), 3 pages.

"Advisory Action", U.S. Appl. No. 12/584,463, (May 17, 2012), 3 pages.

"Final Office Action", U.S. Appl. No. 12/455,652, (May 16, 2012), 30 pages.

"Final Office Action", U.S. Appl. No. 12/584,463, (Feb. 24, 2012), 12 pages.

"Foreign Office Action", Great Britain Application No. 0907818.9, (Mar. 14, 2012), 4 pages.

"Non-Final Office Action", U.S. Appl. No. 12/455,085, (Mar. 15, 2012), 6 pages.

"Advisory Action", U.S. Appl. No. 12/455,653, (Nov. 21, 2011), 3 pages.

"Final Office Action", U.S. Appl. No. 12/455,084, (Jan. 17, 2012), 16 pages.

"Final Office Action", U.S. Appl. No. 12/455,653, (Sep. 14, 2011), 30 pages.

"International Search Report and Written Opinion", Application No. PCT/EP2009/061413, (Apr. 12, 2009), 13 pages.

"International Search Report and Written Opinion", Application No. PCT/EP2009/061418, (Apr. 12, 2009), 13 pages.

"International Search Report and Written Opinion", Application No. PCT/EP2009/061409, (Oct. 20, 2009), 15 pages.

"International Search Report and Written Opinion", Application No. PCT/EP2009/061411, (Nov. 26, 2009), 20 pages.

"International Search Report and Written Opinion", Application No. PCT/EP2009/061416, (Oct. 21, 2009), 13 pages.

"International Search Report and Written Opinion", Application No. PCT/EP2009/061398, (Oct. 20, 2009), 15 pages.

"International Search Report", Application No. PCT/EP2009/061406, (Dec. 4, 2009), 3 pages.

"International Search Report", GB Application 0907818.9, (Aug. 24, 2009), 1 pages.

"Non Final Office Action", U.S. Appl. No. 12/455,653, (Mar. 23, 2011), 22 pages.

"Non-Final Office Action", U.S. Appl. No. 12/455,084, (May 23, 2011), 14 pages.

"Non-Final Office Action", U.S. Appl. No. 12/455,210, (Sep. 29, 2011), 14 pages.

"Non-Final Office Action", U.S. Appl. No. 12/455,652, (Jan. 26, 2012), 28 pages.

"Non-Final Office Action", U.S. Appl. No. 12/584,463, (Oct. 13, 2011), 10 pages.

"Search Report", Application No. GB0816276.0, (Nov. 27, 2009), 2 pages.

"Search Report", Application No. GB0816278.6, (Dec. 2, 2009), 2 pages.

"Search Report", Application No. GB0816280.2, (Dec. 3, 2009), 1 page.

"Search Report", Application No. GB0816281.0, (Nov. 20, 2009), 2 pages.

"Search Report", Application No. GB0816271.1, (Nov. 24, 2009), 2 pages.

"Search Report", Application No. GB0816275.2, (Nov. 23, 2009), 1 page.

"Search Report", Application No. GB0816279.4, (Nov. 26, 2009), 2 pages.

"Written Opinion of the International Searching Authority", Application No. PCT/EP2009/061406, (Dec. 4, 2009), 5 pages.

"Advisory Action", U.S. Appl. No. 12/455,652, (Aug. 30, 2012), 3 pages.

"Final Office Action", U.S. Appl. No. 12/455,085, (Aug. 16, 2012), 7 pages.

"Non-Final Office Action", U.S. Appl. No. 12/455,084, (Aug. 30, 2012), 29 pages.

"Non-Final Office Action", U.S. Appl. No. 12/455,635, (Aug. 22, 2012), 20 pages.

"Non-Final Office Action", U.S. Appl. No. 12/455,653, (Oct. 23, 2012), 28 pages.

"Non-Final Office Action", U.S. Appl. No. 12/583,007, (Aug. 8, 2012), 6 pages.

"Non-Final Office Action", U.S. Appl. No. 12/584,463, (Aug. 3, 2012), 11 pages.

"Advisory Action", U.S. Appl. No. 12/455,085, (Nov. 7, 2012), 3 pages.

"Examination Report", GB Application No. 0816281.0, (Sep. 13, 2012), 2 pages.

"Notice of Allowance", U.S. Appl. No. 12/583,007, (Nov. 29, 2012), 4 pages.

"Notice of Allowance", U.S. Appl. No. 12/584,463, (Nov. 16, 2012), 7 pages.

\* cited by examiner

COMMUNICATION SYSTEM AND METHOD

RELATED APPLICATION

This application claims priority under 35 U.S.C. §119 or 365 to Great Britain Application No. 0816278.6, filed Sep. 5, 2008. The entire teachings of the above application are incorporated herein by reference.

This invention relates to a communication system and method.

Packet-based communication systems allow the user of a device, such as a personal computer, to communicate across a computer network such as the Internet. Packet-based communication systems include voice over internet protocol ("VoIP") communication systems. These systems are beneficial to the user as they are often of significantly lower cost than fixed line or mobile networks. This may particularly be the case for long-distance communication. To use a VoIP system, the user must install and execute client software on their device. The client software provides the VoIP connections as well as other functions such as registration and authentication. In addition to voice communication, the client may also provide further features such as video calling, instant messaging ("IM"), SMS messaging, and voicemail.

One type of packet-based communication system uses a peer-to-peer ("P2P") topology built on proprietary protocols. To enable access to a peer-to-peer system, the user must execute P2P client software provided by a P2P software provider on their computer, and register with the P2P system. When the user registers with the P2P system the client software is provided with a digital certificate from a server. Once the client software has been provided with the certificate, communication can subsequently be set up and routed between users of the P2P system without the further use of a server. In particular, the users can establish their own communication routes through the P2P system based on the exchange of one or more digital certificates (or user identity certificates, "UIC"), which enable access to the P2P system. The exchange of the digital certificates between users provides proof of the users' identities and that they are suitably authorised and authenticated in the P2P system. Therefore, the presentation of digital certificates provides trust in the identity of the user. It is therefore a characteristic of peer-to-peer communication that the communication is not routed using a server but directly from end-user to end-user. Further details on such a P2P system are disclosed in WO 2005/009019.

A problem with packet-based communication systems is that the accessibility of packet-based communication systems for users is limited. In particular, such systems are most commonly accessed using a personal computer. This has the disadvantage that the user must be sufficiently technically competent to download and install the packet-based communication client software on their personal computer, which provides a barrier to the take-up of the use of the packet-based communication system. Even when the communication client is installed and executed on a personal computer, the use of the packet-based communication system may be limited because personal computers are often not located in a place where the user is either familiar or comfortable with communicating. For example, a personal computer is often located in a study, which is not the most natural or familiar environment for making calls for many users.

Whilst packet-based communication systems can also be accessed via certain mobile devices, these generally do not have processing resources or display screens available to offer a full range of features, such as video calling.

There is therefore a need for a technique to address the aforementioned problems with the accessibility of packet-based communication systems.

According to one aspect of the present invention there is provided a media device comprising: a memory storing a communication client application; a processor, coupled to the memory and operable to execute the communication client application, wherein the client application is programmed so as when executed to allow a user to establish a call with one or more other users via a packet-based communication network; and a remote control unit comprising wireless communication means arranged to transmit data to the processor, a control means coupled to the wireless communication means and configured to control the wireless communication means, user input means coupled to the control means and arranged to receive input commands from the user and provide the input commands to the control means, and a microphone coupled to the control means and arranged to receive audio signals from a user, wherein, responsive to the control means receiving a command to establish a call from the user input means, the control means is arranged to activate the wireless communication means from a deactivated state, establish a wireless connection with the processor, and transmit data comprising audio signals from the microphone using the wireless communication means to the processor for transmission in a call over the packet-based communication network.

By have a microphone integrated into the remote control unit, the user is able to easily speak in a call over the packet-based communication network using hardware that is already present with the media device and familiar to the user. The user is not required to purchase and install separate hardware for receiving calls. The user does not have to sit near an in-built microphone on the media device. Instead, the remote control unit is likely to be near the user and therefore the microphone is much closer to where the user is sitting to make the call. Because the activation of the wireless communication means in the remote control is controlled to only be active upon call establishment, the power consumption at the remote control is minimised.

The remote control unit may comprises a further wireless communication means coupled to the control means and arranged to transmit data to the processor. Preferably, the further wireless communication means is an infra-red transmitter. The control means may be arranged to transmit a call establishment message to the processor using the further wireless communication means responsive to receiving the command to establish a call from the user input means.

In one embodiment, the processor is arranged to connect the call over the packet-based communication network responsive to receiving the call establishment message. In another embodiment, the processor is arranged to connect the call over the packet-based communication network responsive to the establishment of the wireless connection with the remote control unit.

The communication client application may be arranged to encode the audio signals received at the processor as voice over internet protocol packets for transmission over the packet-based communication network.

Preferably, the wireless communication means comprises a radio transmitter. Preferably, the radio transmitter is a Bluetooth transmitter.

In one embodiment, the command to establish a call from the user input means is a command to accept an incoming call. The microphone may be retractable from the remote control unit, and the remote control unit is arranged to accept the incoming call responsive to the user retracting the microphone. In another embodiment, the command to establish a call from the user input means is a command to initiate an outgoing call.

Preferably, the control means is further arranged to activate the microphone responsive to the control means receiving a command to establish a call from the user input means.

The communication client application may be arranged to generate notifications to the user of incoming communication events from other users. Preferably, the communication client application is arranged to generate a user interface for output on a television screen. Preferably, the user interface comprises a list of one or more other users of the packet-based communication network associated with the user.

Preferably, the remote control unit further comprises a speaker and a radio receiver, and wherein the processor is arranged to transmit audio signals received from the packet-based communication network in a call to the radio receiver of the remote control unit, and the remote control unit is arranged to play the audio signals from the speaker.

The communication client application may be further arranged to establish an instant messaging session with one or more other users, and the remote control unit arranged to transmit alphanumeric data received at the input means to processor using the wireless communication means for transmission over the packet based communication network in the instant messaging session.

Preferably, the client application is programmed to allow the user to establish calls via a peer-to-peer connection in the packet based communication network.

In one embodiment, the media device comprises one of a television set and a set-top box arranged to connect to a television set. The media device may further comprise a television receiver operable to receive broadcast television signals. The processor may be arranged to reduce the volume of an audio component of the broadcast television signal received at the television receiver responsive to the establishment of a call.

In another embodiment, the media device comprises one of a video disc player arranged to connect to a television set and a personal video recorder arranged to connect to a television set.

According to another aspect of the present invention there is provided a method of establishing a call over a packet-based communication network in a media device having a processor executing a communication client and a remote control unit comprising a microphone, the method comprising: receiving a command to establish a call from a user input means of the remote control unit at a control means of the remote control; responsive to receiving the command, the control means activating a wireless communication means from a deactivated state; the wireless communication means establishing a wireless connection with the processor; and transmitting data comprising audio signals from the microphone of the remote control unit using the wireless communication means to the processor for transmission in a call over the packet-based communication network.

The method may further comprise the step of: the control means transmitting a call establishment message to the processor using a further wireless communication means responsive to receiving the command to establish a call from the user input means.

In one embodiment, the method further comprises the step of the processor connecting the call over the packet-based communication network responsive to receiving the call establishment message. In another embodiment, the method further comprises the step of the processor connecting the call over the packet-based communication network responsive to the establishment of the wireless connection with the remote control unit.

The method may further comprise the step of the communication client application encoding the audio signals received at the processor as voice over internet protocol packets for transmission over the packet-based communication network.

In one embodiment, the command to establish a call from the user input means is a command to accept an incoming call. The microphone may be retractable from the remote control unit, and the method may further comprise the step of accepting the incoming call responsive to the user retracting the microphone. In another embodiment, the command to establish a call from the user input means is a command to initiate an outgoing call.

The method may further comprise the step of the control means activating the microphone responsive to receiving a command to establish a call from the user input means.

The method may further comprise the step of the communication client application generating notifications to the user of incoming communication events from other users.

The method may further comprise the step of the communication client application generating a user interface for output on a television screen. Preferably, the user interface comprises a list of one or more other users of the packet-based communication network associated with the user.

The remote control unit may further comprise a speaker and a radio receiver, and the method may further comprise the steps of: the processor transmitting audio signals received from the packet-based communication network in a call to the radio receiver of the remote control unit; and the remote control unit playing the audio signals from the speaker.

The method may further comprise the steps of: the communication client application establishing an instant messaging session with one or more other users; and the remote control unit transmitting alphanumeric data received at the input means to processor using the wireless communication means for transmission over the packet based communication network in the instant messaging session.

According to another aspect of the present invention there is provided a computer program product comprising program code means which, when executed by a computer implement the steps according to the above method.

For a better understanding of the present invention and to show how the same may be put into effect, reference will now be made, by way of example, to the following drawings in which.

Figure 1:
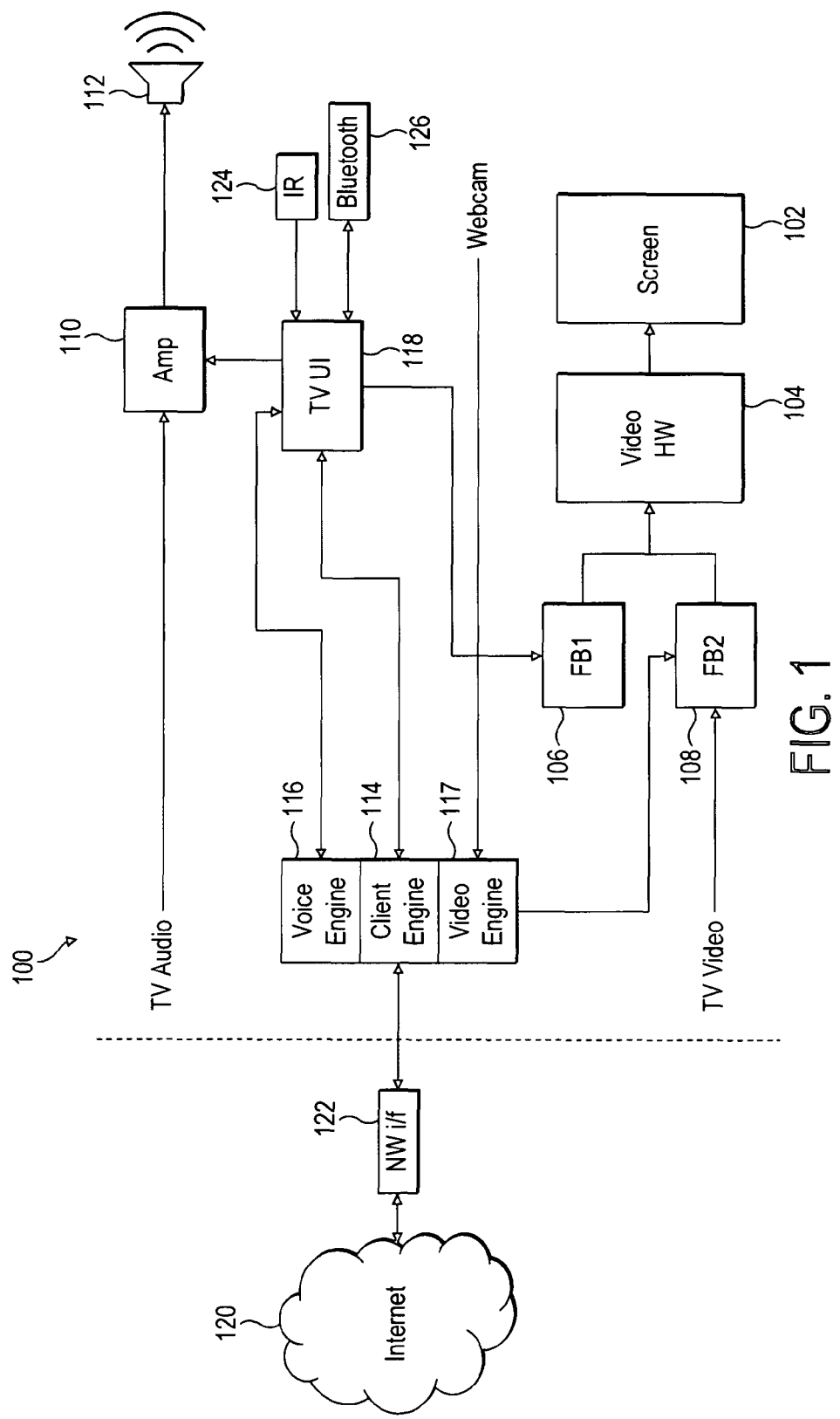
FIG. 1 is a block diagram showing the functional blocks of a TV with an embedded communication client.

In order to overcome the above-mentioned problems with packet-based communication systems, a technique has been developed to enable a user to access such systems from a television ("TV"). This is achieved either by embedding the communication client into the TV itself, or through a separate set-top box ("STB") connected to the TV. In alternative embodiments, the embedded communication client can reside in another device connected to a TV, such as a games console or video playback device (e.g. a video disc player or a personal video recorder).

This is advantageous because the TV can be provided with all the embedded hardware and software required to access the packet-based communication system built-in. Alternatively, this can be embedded into a STB (or other TV-connected device) which is readily connected to an existing TV using known interfaces (such as HDMI, SCART, or component interfaces for example). This eliminates the need for the user to download and install software on their personal computer, and provides a simpler method by which non-technical users can access the packet-based communication system in their home. In addition, the TV is typically located in a living room of a house, which enables the packet-based communication system to be accessed from the location in the house which is most familiar to many users for communicating with friends and relatives due to this being the traditional location for landline PSTN telephones.

The embedding of a packet-based communication client in a TV also has the advantage that a large screen is present, which can be utilised for video calling. Furthermore, significant processing power can be provided in the TV, particular as the power requirements for a large, mains electricity powered consumer electronics device are less stringent than, for example mobile devices. This enables a full range of features to be included in the embedded communication client, such as high quality voice and video encoding.

However, known TVs are not designed to accommodate any form of bi-directional communications. A system is therefore required for enabling user interaction with the TV for making and receiving calls and messages which is intuitive for users.

To achieve this, the remote control of the TV is enhanced to provide functionality which enables the user to make and receive calls, as well as send and receive messages using the TV.

However, a problem with enhancing the functionality of remote controls to enable the user to make calls and receive messages is that the power consumption at the remote control increases significantly. This is problematic since the remote control is a battery-powered device, and the user will therefore need to change the batteries more frequently. Alternatively, if the remote control uses rechargeable batteries, the user will need to charge them more frequently. There is therefore a need for careful power management techniques at the remote control. This is particularly the case in view of the fact that the remote control is being used to control the TV as well providing communication functionality. If the batteries are depleted in the remote control due to the user using communication functionality, then this also means that the user is unable to control the TV (i.e. to change channels, etc.) This causes significant frustration on the part of the user.

Reference is now made to FIG. 1, which illustrates the hardware and software functional blocks embedded in a TV 100. The TV 100 comprises a screen 102 for displaying images to the user, which is driven by video driver hardware 104 arranged to convert the video signals into the form required to be correctly displayed on the screen 102. The video driver hardware 104 is provided with digital video data from two frame buffers 106 and 108. The frame buffers 106 and 108 are storage devices that buffer video data that is to be displayed to the user. Frame buffer 2 ("FB2") 108 receives standard TV video signals, as is known for the display of broadcast TV. Frame buffer 1 ("FB1") 106 stores video data related to the packet-based communication client, as will be described presently. An audio amplifier 110 receives TV audio signals and amplifies these for output through at least one speaker 112.

The TV audio and video input signals themselves originate from television signals broadcast via any suitable means such as a satellite repeater stations, wireless terrestrial repeater stations or cable; and received by a television receiver unit of the TV 100 (not shown). Note that broadcasting is distinct from point-to-point communication, including being distinct from multicasting (i.e. point-to-multipoint). In broadcasting, signals are transmitted indiscriminately, i.e. regardless of whether the user has selected to receive the signal (although a decryption key or such like may still be required so that only authorised users can access the broadcast); whereas in point-to-point communication, signals must be requested by the user or users receiving them. Or put another way, to receive a broadcast a user simply "tunes in" without needing to send any signal to the broadcaster, whereas to establish a point-to-point connection then signals must be exchanged between the user and broadcaster.

The TV receiver unit may comprise for example an antenna, satellite dish or cable input; sampling circuitry; a filter; a low noise amplifier; a mixer, and/or an analogue to digital converter.

After being received by the receiver unit, the signals are then processed by a signal processing apparatus (also not shown) before being input to the frame buffers and amplifiers of FIG. 1. The signal processing may comprise for example a digital filter, demultiplexer, decoder, decryption block, and/or error checking block; which may be implemented in on-chip hardware in the form of one or more on-chip peripherals (not shown), off-chip hardware in the form of one or more off-chip units accessed via one or more of the I/O peripherals, or in software stored in a memory and executed on a central processing unit (CPU) of the television 100 (not shown), or in any combination of these.

The packet-based communication client embedded in the TV 100 is based around four main elements. Preferably, these four elements are software elements that are executed on a processor and stored in a memory. The four elements are: a client engine 114; a voice engine 116; a video engine 117; and a TV user interface 118.

The client engine 114 is responsible for setting up connections to the packet-based communication system. This is performed via a connection from the TV 100 to the internet 120. The TV 100 is connected to the internet 120 via a network interface 122 such as a modem, and the connection between the TV 100 and the network interface 122 may be via a cable (wired) connection or a wireless connection. The client engine 114 performs call set-up, authentication, encryption and connection management, as well as other functions relating to the packet-based communication system such as firewall traversal, presence state updating, and contact list management.

The voice engine 116 is responsible for the encoding of voice signals input to the TV 100 as VoIP packets for transmission over the internet 120 and the decoding of VoIP packets received from the internet 120 for presentation as audio information to the user of the TV 100.

The video engine 117 is responsible for the encoding of video signals input to the TV (e.g. from a webcam or other video camera) as video packets for transmission over the internet 120 in a video call, and the decoding of video packets received from the internet 120 in a video call for presentation as video images to the user of the TV 100.

The TV user interface ("UI") 118 is responsible for presenting visual information to the user of the TV 100 in the form of a graphical user interface displayed on the TV screen 102.

The client engine 114 is connected to the TV UI 118 in order to control what the UI displays to the user. The client engine 114 is also closely integrated with the voice engine 116 and video engine 117 for the efficient transmission and receiving of voice and video packets over the internet.

The voice engine 116 is connected to the TV UI 118 as voice signals from the user are passed through the TV UI 118 to the voice engine 116, and vice versa. The video engine 117 is connected to FB2 108 for providing video data to be displayed on the TV screen 102.

The TV UI 118 is connected to FB1 106, so that the graphical user interface data is buffered and ultimately displayed to the user on the screen 102. The TV UI 118 is also connected to the amplifier 110, enabling sound (such as voice signals or notifications) to be produced from the TV speakers 112. The TV UI 118 is also connected to an infra-red ("IR") receiver 124 and a bluetooth transceiver 126 which are used for communicating with a remote control unit, as will be discussed below.

Note that if the embedded communication client is provided in the form of a STB (or other TV-connected device) for connection to a TV, then the system in FIG. 1 differs only in that the screen 102, amplifier 110 and speaker 112 blocks are located in the TV itself, whereas the remaining functional blocks are located in the set top box, which is connected to the TV.

Figure 2:
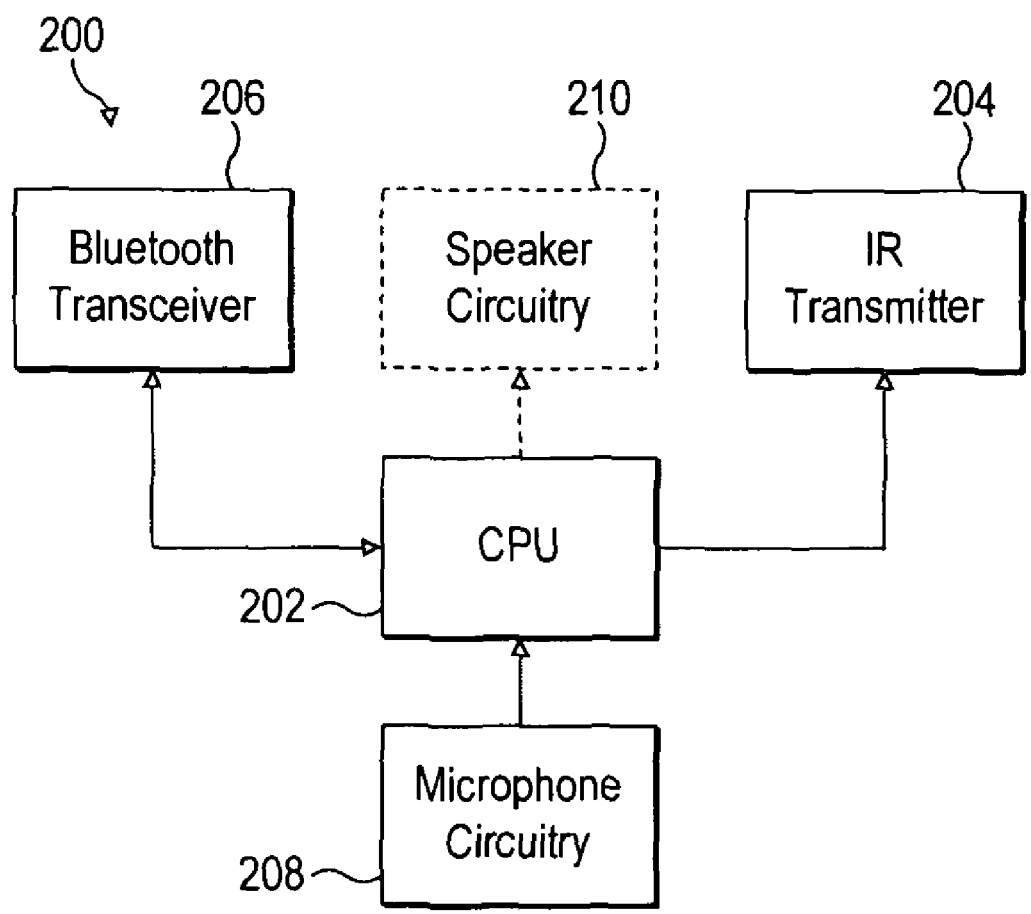
FIG. 2 is a block diagram showing the functional blocks of a remote control unit for use with the TV of FIG. 1.

Reference is now made to FIG. 2, which illustrates the functional blocks of a remote control unit 200 arranged to communicate with the TV 100 of FIG. 1. The remote control unit 200 comprises a central processing unit ("CPU") 202 arranged to control the operation of the remote control unit 200. In particular, the CPU 202 controls the sending and receiving of data between the TV 100 and the remote control unit 200.

The remote control unit 200 is arranged to communicate with the TV 100 by two different methods. Firstly, the remote control comprises an IR transmitter 204, which sends IR signals to the IR receiver 124 in the TV 100. This is performed in a similar manner to conventional remote control units used with televisions. This has the advantage of being power efficient, which is important for a battery powered device such as a remote control. However, this also has the disadvantage of requiring a line-of-sight signal path and a low data rate. The IR transmitter 204 is therefore used for sending commands to the TV 100. These commands include conventional TV commands, such as changing channels, switching to standby and adjusting volume, as well as commands relating to the embedded communication client, as will be described hereinafter.

The second method for communicating with the TV 100 is by a Bluetooth connection. The remote control unit 200 comprises a Bluetooth transceiver 206 which is able to communicate with the Bluetooth transceiver 126 located in the TV 100. Bluetooth is a low-power short-range radio standard, and therefore does not require a line-of-sight signal path. Higher data rates are also available for Bluetooth connections, compared to IR. The Bluetooth transceiver 206 is paired with the Bluetooth transceiver 126 located in the TV 100 such that a data connection can be readily formed between them. The data connection enables the transmission of data from the remote control unit 200 to the TV 100, and, optionally, the reception of data from the TV 100 at the remote control unit 200.

The IR transmitter 204 and the Bluetooth transceiver 206 are connected to the CPU 202, and the CPU 202 controls the activation of these units and provides them with the data to be sent (and optionally reads the data received by the Bluetooth transceiver 206).

Also connected to the CPU 202 is microphone circuitry 208. The microphone circuitry 208 is arranged to receive audio information such as speech from the user of the remote control unit 200 and provide the audio information to the CPU 202 for processing. The audio information can be speech which is subsequently sent to the TV 100, and transmitted over the internet as VoIP packets, as will be described in more detail hereinafter. The microphone circuitry 208 comprises a microphone, an amplifier, and an analogue-to-digital converter for generating a digital representation of the audio signals which can be input to the CPU 202.

Optionally connected to the CPU 202 is speaker circuitry 210. The speaker circuitry 210 is arranged to receive audio data from the CPU 202 and generate audible sound that the user of the remote control can hear. The speaker circuitry 210 can comprise a digital-to-analogue converter, an amplifier and a speaker. The speaker circuitry 210 can be used to enable the user of the remote control unit 200 to hear voice calls from a remote party over the internet, as will be described later.

Figure 3:
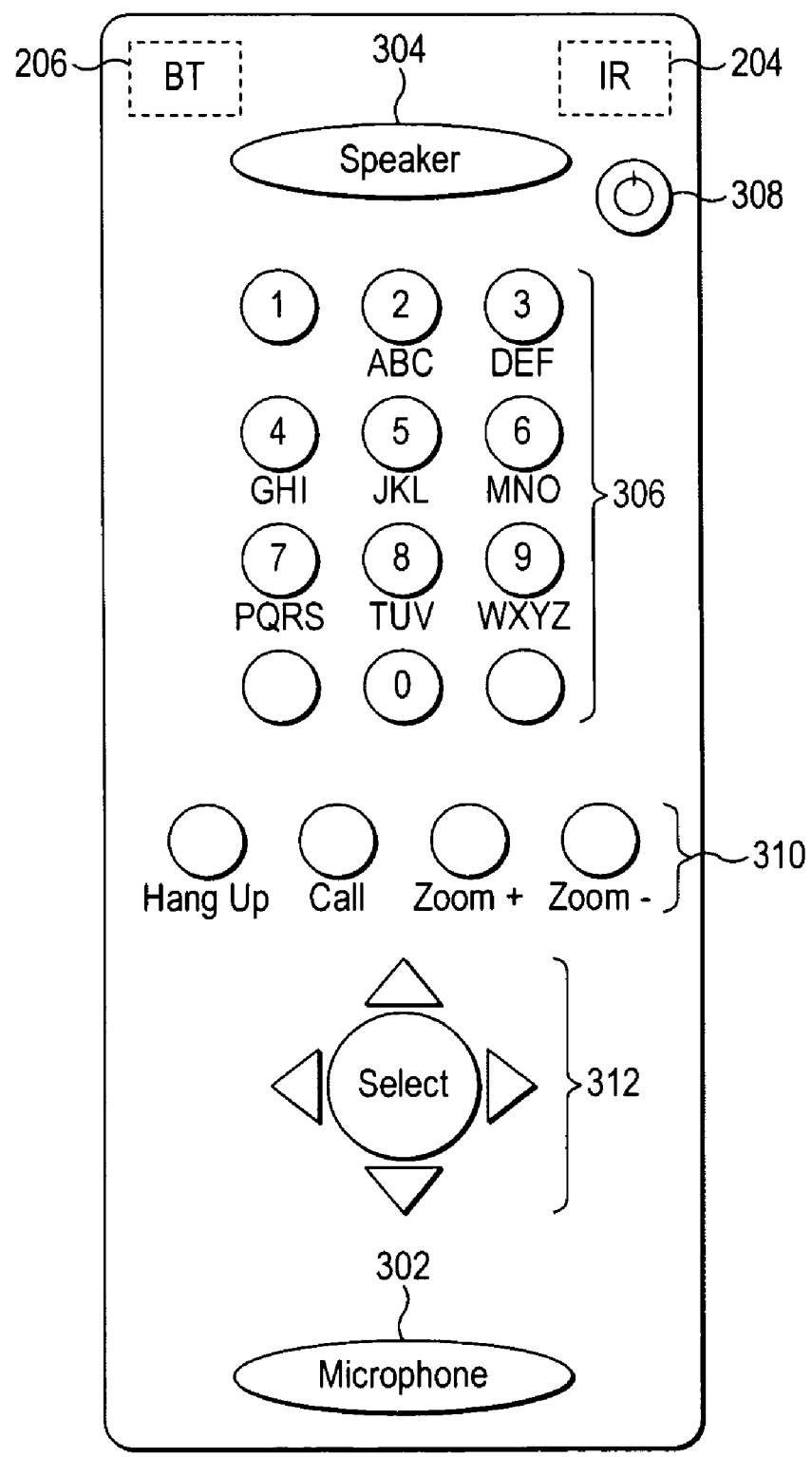
FIG. 3 shows the physical layout of a remote control unit.

Reference is now made to FIG. 3, which illustrates the physical layout of the remote control unit 200. The remote control unit 200 resembles conventional remote controls for TVs. However, the remote control unit 200 includes an integrated microphone 302, and, optionally, an integrated speaker 304. This means that the user does not have to sit near an in-built microphone on the TV 100. Instead, the remote control unit is likely to be nearby the user, and can operate in a similar manner to an external microphone on a teleconferencing system, such that when placed on a nearby object like a coffee table it will be much closer to where the user is sitting during the call, and can pick up the audio from the user. In addition, this also enables the remote control unit 200 to be held to the head of the user in a similar manner to a conventional telephone, if this is preferred by the user. Integrated within the unit are an IR transmitter 204 and Bluetooth transceiver 206, as described above.

The remote control unit 200 further comprises a keypad 306, which is used for conventional TV control purposes, and also for entering information for the embedded packet-based communication client. The keypad 306 comprises numbered keys that can also be used to enter alphabetic characters. A standby button 308 is used for placing the TV 100 into standby mode. Dedicated function keys 310 are used to control the operation of the packet-based communication client, and a directional pad 312 is used for navigating the TV user interface.

Figure 4:
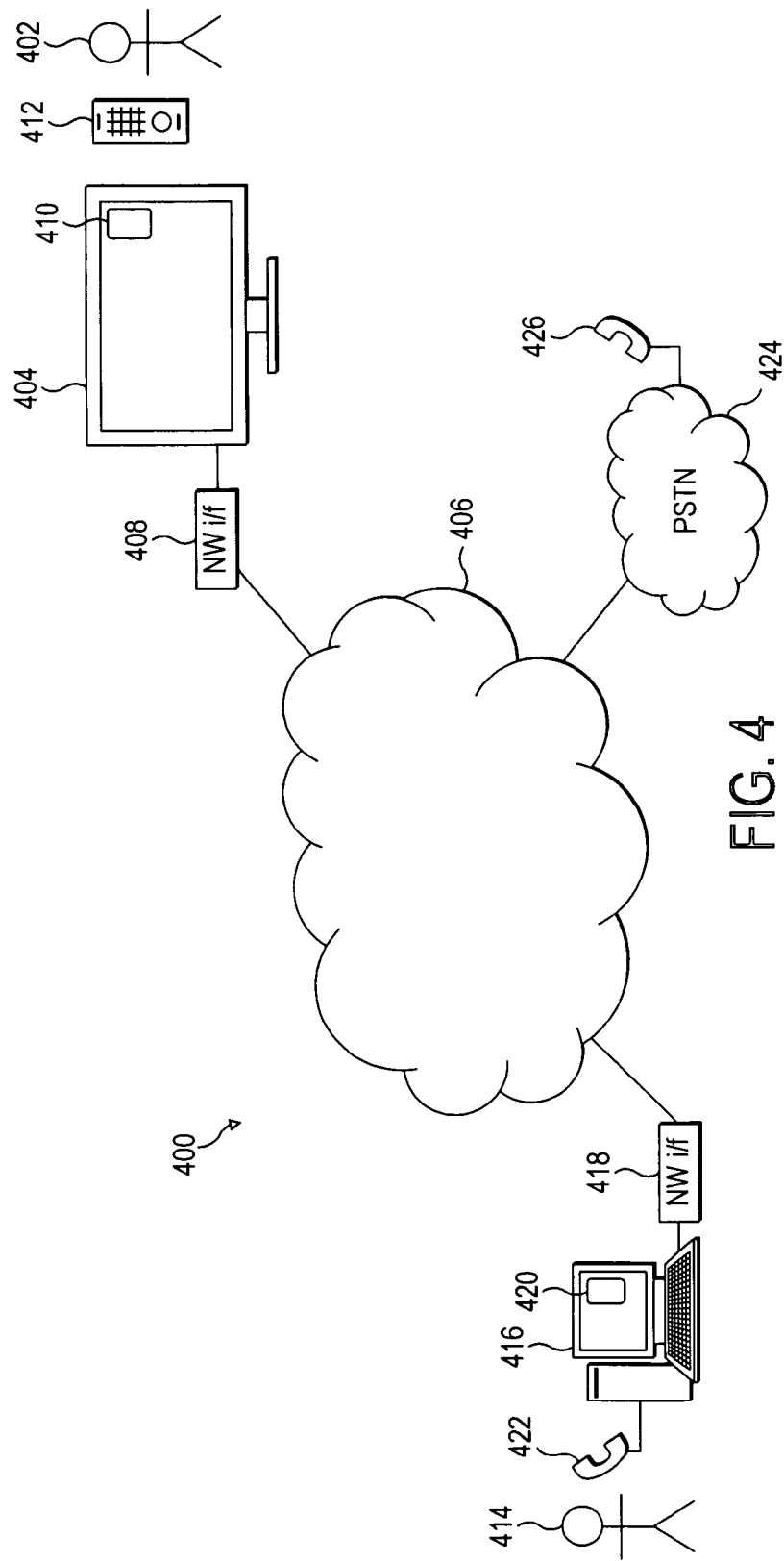
FIG. 4 shows an illustrative packet-based communication system.

In order to describe the operation of the TV 100 and enhanced remote control unit 200 with the packet based communication system, reference is now made to FIG. 4, which illustrates the use of the TV 100 in a portion of an example system 400.

Note that whilst the illustrative embodiment shown in FIG. 4 is described with reference to a P2P communication system, other types of communication system could also be used, such as non-P2P, VoIP or IM systems. The system 300 shown in FIG. 4 shows a first user 402 of the communication system operating a TV 404, which is shown connected to a network 406. Note that the communication system 400 utilises a network such as the Internet. The TV 404 is connected to the network 406 via a network interface 408 such as a modem, and the connection between the user terminal 104 and the network interface 108 may be via a cable (wired) connection or a wireless connection. The TV 404 shown in FIG. 4 is a standalone unit, but it should be appreciated that a separate TV and STB (or other TV-connected device) can also be used.

The TV 404 is executing an embedded communication client 410. Note that in alternative embodiments, the embedded communication client can be executed in a set top box. The embedded communication client 410 comprises software executed on a local processor in the TV 404.

The TV 404 is arranged to receive information from and output information to the user 402. A remote control unit 412 acts as the input device operated by the user 402 for the control of the TV 404. The remote control 412 comprises a microphone and (optionally) a speaker to enable the user to speak and (optionally) listen in a voice call. The remote control unit 412 communicates wirelessly with the TV 404, as described previously.

The TV 404 can also receive broadcast television signals, and display these as video (television programmes) to the user on the TV screen. The broadcast television signals can be delivered by terrestrial, satellite or cable broadcasting, and be in the form of analogue signals or digital data. The user 402 can control the display of the television signals (e.g. which channels to display) using the remote control unit 412.

The embedded communication client 410 is arranged to establish and manage calls made over the packet-based communication system using the network 406. The embedded communication client 410 is also arranged to present information to the user 402 on the screen of the TV 404 in the form of a user interface. The user interface comprises a list of contacts associated with the user 402. Each contact in the contact list has a presence status associated with it, and each of these contacts have authorised the user 402 of the client 410 to view their contact details and presence state.

The contact list for the users of the packet-based communication system is stored in a contact server (not shown in FIG. 4). When the client 410 first logs into the communication system the contact server is contacted, and the contact list is downloaded to the client 410. This allows the user to log into the communication system from any terminal and still access the same contact list. The contact server is also used to store a mood message (a short user-defined text-based status that is shared with all users in the contact list) and a picture selected to represent the user (known as an avatar). This information can be downloaded to the client 410, and allows this information to be consistent for the user when logging on from different terminals. The client 410 also periodically communicates with the contact server in order to obtain any changes to the information on the contacts in the contact list, or to update the stored contact list with any new contacts that have been added.

Also connected to the network 406 is a second user 414. In the illustrative example shown in FIG. 4, the user 404 is operating a user terminal 416 in the form of a personal computer. Note that in alternative embodiments, other types of user terminal can also be connected to the packet-based communication system. In addition to personal computers ("PC") (including, for example, Windows™, Mac OS™ and Linux™ PCs), a personal digital assistant ("PDA"), a mobile phone, or a gaming device could also be connected. In a preferred embodiment of the invention the user terminal 416 comprises a display such as a screen and an input device such as a keyboard, mouse, joystick and/or touch-screen. The user device 416 is connected to the network 406 via a network interface 418 such as a modem.

Note that in alternative embodiments, the user terminal 416 can connect to the communication network 406 via additional intermediate networks not shown in FIG. 4. For example, if the user terminal 416 is a mobile device, then it can connect to the communication network 406 via a mobile network (for example a GSM or UMTS network).

The user terminal 416 is running a communication client 420, provided by the software provider. The communication client 420 is a software program executed on a local processor in the user terminal 416 comprising similar elements to the embedded communication client 410. The communication client 420 enables the user terminal 416 to connect to the packet-based communication system. The user terminal 416 is also connected to a handset 422, which comprises a speaker and microphone to enable the user to listen and speak in a voice call. The microphone and speaker does not necessarily have to be in the form of a traditional telephone handset, but can be in the form of a headphone or earphone with an integrated microphone, as a separate loudspeaker and microphone independently connected to the user terminal 416, or integrated into the user terminal 416 itself.

Presuming that the first user 402 is listed in the contact list of the client 420 presented to second user 414, then the second user 414 can initiate a call to the first user 402 over the communication system by selecting the contact and clicking on a "call" button using a pointing device such as a mouse. The call set-up is performed using proprietary protocols, and the route over the network 406 between the calling user and called user is determined by the peer-to-peer system without the use of servers.

Following authentication through the presentation of digital certificates (to prove that the users are genuine subscribers of the communication system—described in more detail in WO 2005/009019), the call can be established.

Referring again to FIGS. 1 and 2, when the incoming call is received at the client engine 114 the TV UI 118 is notified of the incoming call. This places the TV UI 118 into an incoming call state, such that key presses from remote are interpreted appropriately for this state. The TV UI 118 outputs graphics to the FB1 106 to display a notification of the incoming call on the TV screen 102, such that the user 402 is aware of the incoming call. The notification may only be active for a predetermined time, after which time the notification will fade (if the TV is capable of supporting this) and the incoming call state will be deactivated. Note further that the notification method can change depending on whether or not the TV is in standby mode or is active. If the TV 100 is active, the notification is displayed on the screen 102. If the TV is in standby mode, the client engine 114 can control the TV UI 118 to notify the user of an incoming call by producing a sound (via the amplifier 110 and speakers 112), flashing an LED (not shown in FIG. 1) or activating the TV screen 102.

Figure 5:
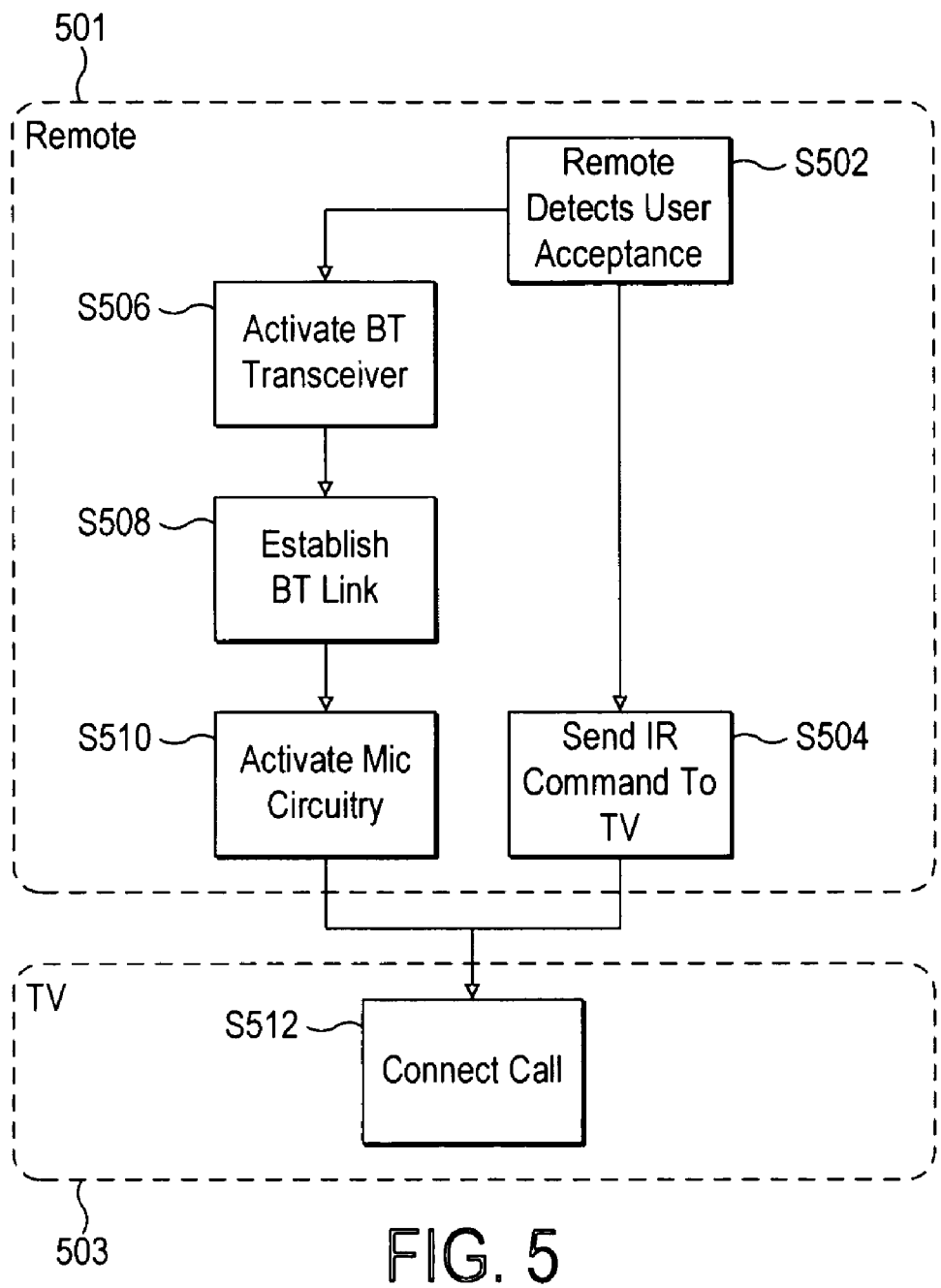
FIG. 5 shows a flowchart of a process performed when the user is notified of an incoming call.

Reference is now made to FIG. 5, which illustrates a flowchart of the processes performed when the user is notified of an incoming call. Note that box 501 indicates the steps performed at the remote control unit 200, and box 503 indicates the steps performed at the TV 100.

The user 402 can select to answer the incoming call by pressing a key on the remote control unit 412 or enacting a physical motion such as sliding out a movable microphone unit. In step S502, the remote control unit detects that the user has selected to accept the incoming call. In response to the user 402 selecting to answer the incoming call the remote control unit 200 transmits a command to the TV 100 using the IR transmitter 204 in step S504. This command indicates that the user has selected to accept the call (either by pressing a button or performing an action).

In parallel with this, the remote control unit 200 activates the Bluetooth transceiver 206 in step S506. The Bluetooth transceiver 206 is not activated until it is needed to save battery power consumption. This is because the Bluetooth transceiver 206 is considerably more power-hungry than the IR transmitter 204, and is not required for controlling TV functionality (changing channels etc.), so can be deactivated until it is required for communication functionality.

In step S508, the Bluetooth transceiver 206 establishes a connection with the Bluetooth transceiver 126 in the TV 100. In step S510, the microphone circuitry 208 is enabled, such that audio inputs to the microphone are input to the CPU 202. This saves further power at the remote control unit, as the microphone circuitry remains deactivated until it is required for communication functionality.

In step S512, when the TV UI 118 receives the command transmitted via the IR transmitter 204 at the IR receiver 124, this is interpreted this as a call accept command, since the TV UI 118 is in the incoming call state. Note that in alternative embodiments, the IR command sent from the remote control unit 200 in step S504 can be omitted, and the establishment of the Bluetooth connection between the TV 100 and the remote 200 can be interpreted as a call accept command instead.

The TV UI 118 outputs an "answer call" command to the client engine 114. In response to the "answer call" message, the client engine 114 establishes the call connection with the communication client 420 of the calling user 414.

When the user 402 talks into the microphone 302 (shown in FIG. 3), the audio signal is converted to digital data by the microphone circuitry 208 and input to the CPU 202. The CPU 202 controls the Bluetooth transceiver 206 to transmit the audio signal to the Bluetooth transceiver 126 of the TV 100. The transmission of the audio can utilise a standard Bluetooth protocol for transmitting audio information.

Upon receiving the audio information at the Bluetooth transceiver 126, the TV UI 118 passes the audio information to the voice engine 116. The voice engine 116 encodes the audio information as VoIP packets and passes these to the client engine 114. The client engine 114 transmits the VoIP packets to the network 406 via the network interface 408, where they are routed to the communication client 420 running on the user terminal 416 of the second user 414. The client 420 decodes the VoIP packets to produce an audio signal that can be heard by the user 414 using the handset 422.

Conversely, when the second user 414 talks into handset 422, the client 420 executed on user terminal 416 encodes the audio signals into VoIP packets and transmits them across the network 406 to the TV 404. The VoIP packets are received at the client engine 114 and passed to the voice engine 116. The voice engine 116 decodes the VoIP packets to produce audio information. The audio information is passed to the TV UI 118.

In one embodiment, the audio information is passed from the TV UI 118 to the amplifier 110, such that the voice from the second user 414 is heard from the TV speakers 112. If the TV 100 is currently being used to watch a TV programme, then the audio from the TV programme can be deactivated. Alternatively, the audio from the call can be mixed with the TV programme audio, which can be decreased in volume. Alternatively, if the user has a multi-speaker set-up, then the audio from the call can be played from at least one of the speakers, and the TV programme sound from the other speakers.

In an alternative embodiment, if the remote control unit 200 comprises the optional speaker circuitry 210, as described above with reference to FIG. 2, the audio information from the TV UI 118 can be passed to the Bluetooth transceiver 126 and transmitted to the remote control unit 200. At the remote control unit 200, it is received by the Bluetooth transceiver 206, and interpreted by the CPU 202 and converted to audible signals by the speaker circuitry 210.

The user can then hear the voice of the second user 414 from the speaker (304 in FIG. 3) in the remote control unit 200. Concurrently with this, the TV UI 118 can control the amplifier 110 to deactivate or decrease the volume of the audio signals of a TV programme that may be being viewed at the same time. Having a speaker located in the remote control unit 200 is advantageous because it enables the user to operate the remote control unit 200 in a manner similar to a traditional telephone handset, which is familiar to the user. In addition, it enables the user to move around while communicating (within the confines of the Bluetooth transceiver range) in a similar manner to a cordless telephone. However, the presence of the speaker circuitry 210 in the remote control unit 200 does give rise to higher power consumption at the remote.

The remote control unit 200 can also be used for initiating a call to another party. For example, the first user 402 can use the remote control unit 200 to initiate a call to the second user 414. The TV UI 118 has a "call set up" state which can be entered by the user. The call set up state can be entered by the user selecting a calling functionality option using the remote, for example using a dedicated button on the remote or by navigating to an on-screen option using the directional pad (312 in FIG. 3). Alternatively, the call entry state can be entered by performing a physical action on the remote, such sliding out a movable microphone. In response to this a command is sent to the TV 100 which causes the call entry state to be entered. Typically, the call entry state displays a UI to the user comprising the contact list and a contact name/phone number entry field.

The first user 402 can select the second user 414 from the contact list and initiate the call using the remote control unit. As described above for an incoming call with reference to FIG. 5, the remote control detects the user acceptance (this time to initiate a call) in step S502, and the remote control unit sends an IR command to the TV 100 in step S504, activates the Bluetooth transceiver 206 in step S506, establishes a Bluetooth connection in step S508 and activates the microphone circuitry 208 in S510. The TV UI 118 sends a message to the client engine 114 to initiate the call to the second user 414 in step S512. This is performed in a similar manner to that described above for a call initiated from the second user 414 to the first user 402. The call can then proceed in the same manner as described previously.

The VoIP packets for calls between users (such as 402 and 414) as described above are passed across the network 406 only, and the public switched telephone network ("PSTN") (424) is not involved. Furthermore, in the preferred embodiment of a P2P system, the actual voice calls between users of the communication system can be made with no central servers being used. This has the advantages that the network scales easily and maintains a high voice quality, and the call can be made free to the users.

However, in addition, calls can also be made from the embedded communication client 410 using the packet-based communication system to fixed-line or mobile telephones (e.g. 426), by routing the call to the PSTN network 424. Similarly, calls from fixed-line or mobile telephones 426 can be made to the packet-based communication system via the PSTN 424.

In addition to making voice calls, the user 402 of the client 410 can also communicate with the users listed in the contact list in several other ways. For example, an instant message (also known as a chat message) can be sent to a contact. As with voice calls, the remote control unit 200 can be used for instant messaging. Text data can be input using the number keys 306, which are also used to enter alphabetic characters. The text data is transmitted to the TV 100 using the IR transmitter 204, as this is more power-efficient than Bluetooth and does not require a high data rate.

The TV UI 118 has a "chat entry state" in which key presses from the remote control unit (received at the IR receiver 124) are interpreted as alphanumeric characters that are passed to the client engine 114. The chat entry state can be entered when a user responds to an incoming chat message, or when the user 402 selects a "chat" option displayed in the UI. The chat message data is encoded and sent from the client engine 114 over the network 406 to the communication client 420 of, for example, the second user 414. The message is displayed to the second user 414 on the user terminal 416. The second user 414 can respond by entering his own chat message, which is sent by the client 420 and received at the client engine 114. The client engine passes the message to the TV UI 118, which displays the message to the user 402 on the screen 102.

The above-described system therefore provides the ability to make and receive calls and IM messages on a TV. By integrating a microphone into the remote control, the user can easily speak in a call using hardware that is already present with the TV. Therefore, the user is not required to purchase and install separate hardware for receiving calls. Because the remote control unit communicates with the TV using a radio link to send the voice signals, the user is free to move around while talking. Furthermore, the user does not have to sit near an in-built microphone on the TV. Instead, the remote control unit is likely to be near the user and can be arranged to work like an external microphone on a teleconferencing system, such that when placed on a nearby object like a coffee table the microphone is much closer to where the user is sitting to make the call. Because the activation of the radio and microphone systems in the remote control is controlled to only be active when needed, the power consumption at the remote control is minimised. The audio signals produced from TV programmes that are being watched are also controlled, which enables the user to talk without competing with the audio from the TV programmes.

While this invention has been particularly shown and described with reference to preferred embodiments, it will be understood to those skilled in the art that various changes in form and detail may be made without departing from the scope of the invention as defined by the appendant claims. In particular, whist the embodiments described above have been described with reference to a TV with an embedded communication client, it should be understood that the client can also be embedded into another type of media device for connection to a TV, such a set top box, a games console or video playback device (e.g. a video disc player or a personal video recorder). Furthermore, whilst the invention has been described in the context of a P2P communication system, it will be understood that the invention can be used in combination with other, non-P2P, packet-based communication systems.

According to the invention in certain embodiments there is provided a method of establishing a call over a packet-based communication network as herein described having the following features.

The method may comprise the control means transmitting a call establishment message to the processor using a further wireless communication means responsive to receiving the command to establish a call from the user input means.

The method may comprise the step of the processor connecting the call over the packet-based communication network responsive to receiving the call establishment message.

The method may comprise the step of the processor connecting the call over the packet-based communication network responsive to the establishment of the wireless connection with the remote control unit.

The method may comprise the step of the communication client application encoding the audio signals received at the processor as voice over internet protocol packets for transmission over the packet-based communication network.

The command to establish a call from the user input means may be a command to accept an incoming call.

The microphone may be retractable from the remote control unit, and the method may further comprising the step of accepting the incoming call responsive to the user retracting the microphone.

The command to establish a call from the user input means may be a command to initiate an outgoing call.

The method may comprise the step of the control means activating the microphone responsive to receiving a command to establish a call from the user input means.

The method may comprise the step of the communication client application generating notifications to the user of incoming communication events from other users.

The method may comprise the step of the communication client application generating a user interface for output on a television screen.

The user interface may comprise a list of one or more other users of the packet-based communication network associated with the user.

The remote control unit may further comprise a speaker and a radio receiver, and the method may further comprise the steps of:
  the processor transmitting audio signals received from the packet-based communication network in a call to the radio receiver of the remote control unit; and
  the remote control unit playing the audio signals from the speaker.

The method may further comprise the steps of:
  the communication client application establishing an instant messaging session with one or more other users; and
  the remote control unit transmitting alphanumeric data received at the input means to processor using the wireless communication means for transmission over the packet based communication network in the instant messaging session.

The client application may be programmed to allow the user to establish calls via a peer-to-peer connection in the packet based communication network.

The media device may comprise one of a television set and a set-top box arranged to connect to a television set.

The method may comprise the step of receiving broadcast television signals at a television receiver.

The method may comprise the step of the processor reducing the volume of an audio component of the broadcast television signal received at the television receiver responsive to the establishment of a call.

The media device may comprise one of a video disc player arranged to connect to a television set and a personal video recorder arranged to connect to a television set.

The invention claimed is:

1. A communication system comprising:
  a media device comprising:
    a memory storing a communication client application;
    a processor, coupled to the memory and operable to execute the communication client application, wherein the communication client application is programmed so as to be executed to allow a user to establish a call with one or more other users via a packet-based communication network; and a remote control unit comprising a first wireless communication means and a second wireless communication means each arranged to transmit data to the media device, a control means coupled to the wireless communication means and configured to control the first and second wireless communication means, user input means coupled to the control means and arranged to receive input commands from the user and provide the input commands to the control means, and a microphone coupled to the control means and arranged to receive voice input from a user, wherein, responsive to the control means receiving a command to establish a call from the user input means, the control means is arranged to transmit a call establishment message to the media device via the second wireless communication means responsive to receiving the command to establish a call from the user input means, activate the first wireless communication means from a deactivated state, establish a wireless connection with the media device, and transmit data comprising audio signals from the microphone using the first wireless communication means to the media device for transmission in a call over the packet-based communication network.

2. A communication system according to claim 1, wherein the second wireless communication means is configured to communicate data to the media device while the first wireless communication means is in the deactivated state.

3. A communication system according to claim 2, wherein the second wireless communication means is an infra-red transmitter.

4. A communication system according to claim 2, wherein in an event that a notification of an incoming call is received at the media device, the control means is arranged to transmit a call acceptance message to the media device using the second wireless communication means responsive to receiving the command to accept the incoming call from the user input means.

5. A communication system according to claim 4, wherein the processor is arranged to connect the call over the packet-based communication network responsive to receiving the call establishment message.

6. A communication system according to claim 1, wherein the processor is arranged to connect the call over the packet-based communication network responsive to the establishment of the wireless connection with the remote control unit.

7. A communication system according to claim 1, wherein the communication client application is arranged to encode the audio signals received at the processor as voice over internet protocol packets for transmission over the packet-based communication network.

8. A communication system according to claim 1, wherein the first wireless communication means comprises a radio transmitter.

9. A communication system according to claim 8, wherein the radio transmitter is a Bluetooth transmitter.

10. A communication system according to claim 1, wherein the command to establish a call from the user input means is a command to accept an incoming call.

11. A communication system according to claim 10, wherein the microphone is retractable from the remote control unit, and the remote control unit is arranged to indicate acceptance of the incoming call responsive to the user retracting the microphone.

12. A communication system according to claim 1, wherein the command to establish a call from the user input means is a command to initiate an outgoing call.

13. A communication system according to claim 1, wherein the control means is further arranged to activate the microphone responsive to the control means receiving a command to establish a call from the user input means.

14. A communication system according to claim 1, wherein the communication client application is arranged to generate notifications to the user of incoming communication events from other users.

15. A communication system according to claim 1, wherein the communication client application is arranged to generate a user interface for output on a television screen.

16. A communication system according to claim 15, wherein the user interface comprises a list of one or more other users of the packet-based communication network associated with the user.

17. A communication system according to claim 1, wherein the remote control unit further comprises a speaker and a radio receiver, and wherein the processor is arranged to cause audio signals received from the packet-based communication network in a call to be transmitted to the radio receiver of the remote control unit, and the remote control unit is arranged to play the audio signals received from the packet-based communication network from the speaker.

18. A communication system according to claim 1, wherein the communication client application is further arranged to establish an instant messaging session with one or more other users, and the remote control unit arranged to transmit alphanumeric data received at the input means to the media device using the first wireless communication means for transmission over the packet based communication network in the instant messaging session.

19. A communication system according to claim 1, wherein the communication client application is programmed to allow the user to establish calls via a peer-to-peer connection in the packet based communication network.

20. A communication system according to claim 1, wherein the media device comprises one of a television set, or a set-top box arranged to connect to a television set.

21. A communication system according to claim 20, further comprising a television receiver operable to receive broadcast television signals.

22. A communication system according to claim 21, wherein the processor is arranged to cause the volume of an audio component of the broadcast television signal received at the television receiver to be reduced responsive to an establishment of a call.

23. A communication system according to claim 1, wherein the media device comprises one of a video disc player arranged to connect to a television set, or a personal video recorder arranged to connect to a television set.

* * * * *